(12) United States Patent
Lamb et al.

(10) Patent No.: US 8,857,252 B2
(45) Date of Patent: Oct. 14, 2014

(54) OPTIMAL TIRE PERFORMANCE INDICATOR

(75) Inventors: Matthew Lamb, Waxhaw, NC (US); Robort Liu, Waxhaw, NC (US)

(73) Assignee: Continental Reifen Deutschland GmbH, Hannover (DE)

( * ) Notice: Subject to any disclaimer, the term of this patent is extended or adjusted under 35 U.S.C. 154(b) by 122 days.

(21) Appl. No.: 13/495,625

(22) Filed: Jun. 13, 2012

(65) Prior Publication Data
US 2013/0333458 A1 Dec. 19, 2013

(51) Int. Cl.
*G01M 17/02* (2006.01)

(52) U.S. Cl.
USPC .................................. 73/146; 73/8

(58) Field of Classification Search
USPC .................................. 73/146–146.8
See application file for complete search history.

(56) References Cited

U.S. PATENT DOCUMENTS

| | | | | |
|---|---|---|---|---|
| 4,851,809 | A * | 7/1989 | McAlister | 340/442 |
| 7,000,661 | B2 * | 2/2006 | Segatta et al. | 152/170 |
| 7,011,126 | B2 * | 3/2006 | Heinen | 152/154.2 |
| 2003/0042310 | A1 * | 3/2003 | Olds et al. | 235/454 |
| 2005/0081971 | A1 | 4/2005 | Heinen | |
| 2006/0042366 | A1 * | 3/2006 | Carrus et al. | 73/146 |
| 2008/0264327 | A1 * | 10/2008 | Pett et al. | 116/212 |
| 2010/0065174 | A1 * | 3/2010 | Matsunaga et al. | 152/209.14 |
| 2011/0239753 | A1 * | 10/2011 | Shannon | 73/146.8 |
| 2012/0085159 | A1 * | 4/2012 | Chebli et al. | 73/146 |

FOREIGN PATENT DOCUMENTS

| | | |
|---|---|---|
| AU | 1582176 | 1/1978 |
| EP | 1 066 991 A2 | 1/2001 |
| EP | 2 329 967 A1 | 6/2011 |

OTHER PUBLICATIONS

Search Report and Written Opinion in counterpart International Application No. PCT/US2013/045410, dated Oct. 30, 2013.
Allegemeiner Deutscher Automobil-Club e.V.: Die Kennzeichnung des Pkw-Reifens, Jul. 19, 2010.
Michelin: "How to check your tyre tread wear levels care guide learn and share," May 24, 2012.
Michelin: Home—Cars—Learn and Share-Buying Guide—When should I change my tyres? 2, May 18, 2010.

* cited by examiner

*Primary Examiner* — Andre Allen
(74) *Attorney, Agent, or Firm* — Greenblum & Bernstein, P.L.C.

(57) ABSTRACT

A tire performance indicator for a tire includes at least one tread wear indicator region structured and arranged in a tread region of the tire and at least one performance symbol guide structured and arranged approximate a sidewall region of the tire.

20 Claims, 2 Drawing Sheets

OPTIMAL TIRE PERFORMANCE INDICATOR

BACKGROUND OF THE INVENTION

1. Field of the Invention

The present disclosure is directed to an improved optimal tire performance indicator.

2. Description of the Related Art

The tread is the part of a tire that comes in contact with the road surface. The portion in contact with the road at a given instant in time is known as the contact patch or footprint. The tread may be a thick rubber, or rubber/composite compound formulated to provide an appropriate level of traction that does not wear away too quickly. The tread pattern is characterized by the geometrical shape of the grooves, blocks, voids and sipes. Grooves run generally circumferentially around the tire, and are structured to channel away water. Blocks (or lugs) are that portion of the tread design that contacts the road surface. Voids are spaces between blocks (or lugs) that allow the blocks to flex and also provides spaced for water to evacuate. Tread patterns may feature non-symmetrical (or non-uniform) lug sizes circumferentially in order to minimize noise levels at discrete frequencies.

Hydroplaning, also known as aquaplaning, is the condition where a layer of water builds up between the tire and road surface. Hydroplaning occurs when the grooves in the tread pattern cannot channel away enough water at an adequate rate to ensure a semi-dry footprint area. When hydroplaning occurs, the tire effectively "floats" above the road surface on a cushion of water, thereby losing traction, braking and steering, creating a very unsafe driving condition. When hydroplaning occurs, there is considerably less responsiveness of the steering wheel.

Tread wear, also known as tire wear, is caused by friction between the tire and the road surface. As a tire wears, traction (e.g., dry traction, wet traction and snow traction) is reduced as compared to a new tire. Thus, proper vehicle safety requires specific attention to tread depth and general condition of the tires (amongst other conditions). Moreover, a tire retains optimal performance for certain weather (and road) conditions (e.g., snowy conditions, rainy conditions, and/or sunny conditions) for only part of the tire's service life. For example, a tire that is initially suitable for snowy road conditions (and rainy and sunny conditions), may experience tread wear to such an extent that the tire no longer provides adequate traction in snowy conditions, while still remaining safe for rainy and/or sunny (or dry) road conditions.

To alert the driver when a tire has reached, or is approaching, its wear limit, wear bars (or wear indicators) or other raised features can be located near the bottom of the tread grooves to provide a visible indicator. When the tread lugs are worn to the point that the wear bars connect across the lugs, the tires can be understood to be fully worn and ready to be taken out of service. Some wear indicators additionally function as performance indicators, indicating a degree or extent of wear, e.g., using a numerical scale or weather symbols integrated within the tread pattern.

However, with conventional wear indicators, the tire owner cannot tell easily at which point the optimal service is no longer available. That is, as existing tire performance indicators integrate the numerical scale or weather symbols within the tread pattern of the tire, a tire owner's view of the indicator may be obstructed by the positioning of the vehicle housing relative to the tire, so that the owner cannot easily observe such tire performance indicators located within the tread pattern. As such, it is difficult for a tire owner, for example, to observe the current wear state of the tire, and thus, difficult to determine when the optimal service for certain conditions (e.g., for snowy conditions, rainy conditions, and/or sunny conditions) has been exceeded.

Therefore, there is a need for an improved optimal tire performance indicator.

SUMMARY OF THE INVENTION

The present disclosure is directed to an improved optimal tire performance indicator.

In embodiments, the present invention provides an indicator for the tire owner to visually assess a tire's optimal performance capability.

Aspects of the present invention are directed to a tire performance indicator for a tire, comprising at least one tread wear indicator region structured and arranged in a tread region of the tire and at least one performance symbol guide structured and arranged approximate a sidewall region of the tire.

In additional embodiments of the invention, the at least one tread wear indicator region comprises at least two tread wear indicators, each having a different height relative to a base of an adjacent groove, and each configured to be worn away with progressive use of the tire.

In further embodiments of the invention, the at least one tread wear indicator region comprises three tread wear indicators each having a different height relative to a base of an adjacent groove, and each configured to be worn away with progressive use of the tire.

In yet additional embodiments of the invention, the at least two tread wear indicators comprise respective wear indicia.

In embodiments of the invention, the respective wear indicia comprise different dot patterns.

In additional embodiments of the invention, the at least two tread wear indicators comprise three tread wear indicators having respective wear indicia, wherein the respective wear indicia are configured to be worn away at a tread thickness of $5/32''$, $4/32''$ and $2/32''$, respectively.

In further embodiments of the invention, the at least one performance symbol guide comprises two or more weather symbols, and for each weather symbol, a corresponding identification pattern.

In yet additional embodiments of the invention, the two or more weather symbols comprise three weather symbols.

In embodiments of the invention, the three weather symbols comprise a sunny weather conditions symbol, a rainy weather conditions symbol, and a snowy weather conditions symbol.

In additional embodiments of the invention, the at least one tread wear indicator region comprises at least two tread wear indicators, each having a different height, the at least two tread wear indicators comprise respective wear indicia configured to be worn away with progressive use of the tire, and the wear indicia and the identification patterns utilize a common pattern scheme to identify a tread wear indicator corresponding to each of the respective weather symbols.

In further embodiments of the invention, at least one tread wear indicator region and the at least one performance symbol guide are circumferentially aligned with each other.

In yet additional embodiments of the invention, the at least one tread wear indicator region comprises a plurality of tread wear indicator regions circumferentially spaced around the tire, the at least one performance symbol guide comprises a plurality of performance symbol guide circumferentially spaced around the tire, and respective tread wear indicator regions and performance symbol guides are axially aligned with each other.

Additional aspects of the present invention are directed to a method of forming a tire having a tire performance indicator, wherein the tire performance indicator includes at least one tread wear indicator region structured and arranged in a tread region of the tire, the at least one tread wear indicator region having at least one tread wear indicator located at a height to indicate a wear limit for a predetermined condition, and at least one performance symbol guide structured and arranged approximate a sidewall region of the tire, the at least one performance symbol guide having at least one of at least one weather symbol, and at least one identification pattern. The method comprises forming the tire so that the at least one tread wear indicator region and the at least one performance symbol guide are axially aligned.

In additional embodiments of the invention, the at least one weather symbol comprises two or more weather symbols, which include at least two of: a sunny weather conditions symbol, a rainy weather conditions symbol, and a snowy weather conditions symbol.

In additional embodiments of the invention, the respective wear indicia comprise different dot patterns.

In additional embodiments of the invention, the respective wear indicia of the at least one tread wear indicator region correspond with respective identification patterns of the at least one performance symbol guide.

Additional aspects of the present invention are directed to a method of determining whether a tire is suited for optimal performance for a given weather condition. The tire has a tire performance indicator comprising at least one performance symbol guide structured and arranged approximate a sidewall region of the tire, the at least one performance symbol guide having one or more weather symbols, and for each of the one or more weather symbols, a corresponding identification pattern. The method comprises determining the suitability of the tire for optimal performance by observing a weather symbol.

In additional embodiments of the invention, the tire performance indicator further comprises at least one tread wear indicator region structured and arranged in a tread region of the tire, the at least one tread wear indicator region having at least one tread wear indicator, each of the at least one tread wear indicator having a different height and a respective wear indicia configured to be worn away with progressive use of the tire. The method further comprises identifying a highest tread wear indicator on which the respective wear indicia remains by its respective wear indicia, correlating the respective wear indicia of the highest tread wear indicator on which the respective wear indicia remains to a respective identification pattern, and identifying the weather symbol corresponding to the respective identification pattern to determine the optimal performance range for the tire.

In further embodiments of the invention, the tire performance indicator further comprises at least one tread wear indicator region structured and arranged in a tread region of the tire, the at least one tread wear indicator region having at least one tread wear indicator, each of the at least one tread wear indicator having a different height and a respective wear indicia configured to be worn away with progressive use of the tire. The method further comprises identifying a respective identification pattern corresponding to a particular weather condition using the performance symbol guide, determining whether the respective wear indicia corresponding to the identification pattern remains on a respective tread wear indicator, and when the wear indicia remains on a respective tread wear indicator, determining that the tire retains its optimal tire performance for the particular weather condition.

In additional embodiments of the invention, the wear indicia and the identification patterns utilize a common pattern scheme to identify a tread wear indicator corresponding to each of the respective weather symbols.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

Reference numbers refer to the same or equivalent parts of the present invention throughout the various figures of the drawings.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The present disclosure provides an improved way for the tire owner to visually assess a tire's optimal performance capability. In embodiments, the disclosure uses a symbol system on the sidewall area linked to visual indicators in the tread area to indicate when the optimal weather service of the tire is available. In other words, in embodiments, the optimal tire performance indicators of the present disclosure separate the weather symbols from the tire wear indicators, such that the weather symbols are more permanent and visible for reference by the tire owner.

The optimal performance indicator in accordance with embodiments of the invention, provides an easy way for the tire owner to visually assess the service condition of the tire, and thus, ensures the tires are within their optimal service life for the given weather conditions.

Figure 1:
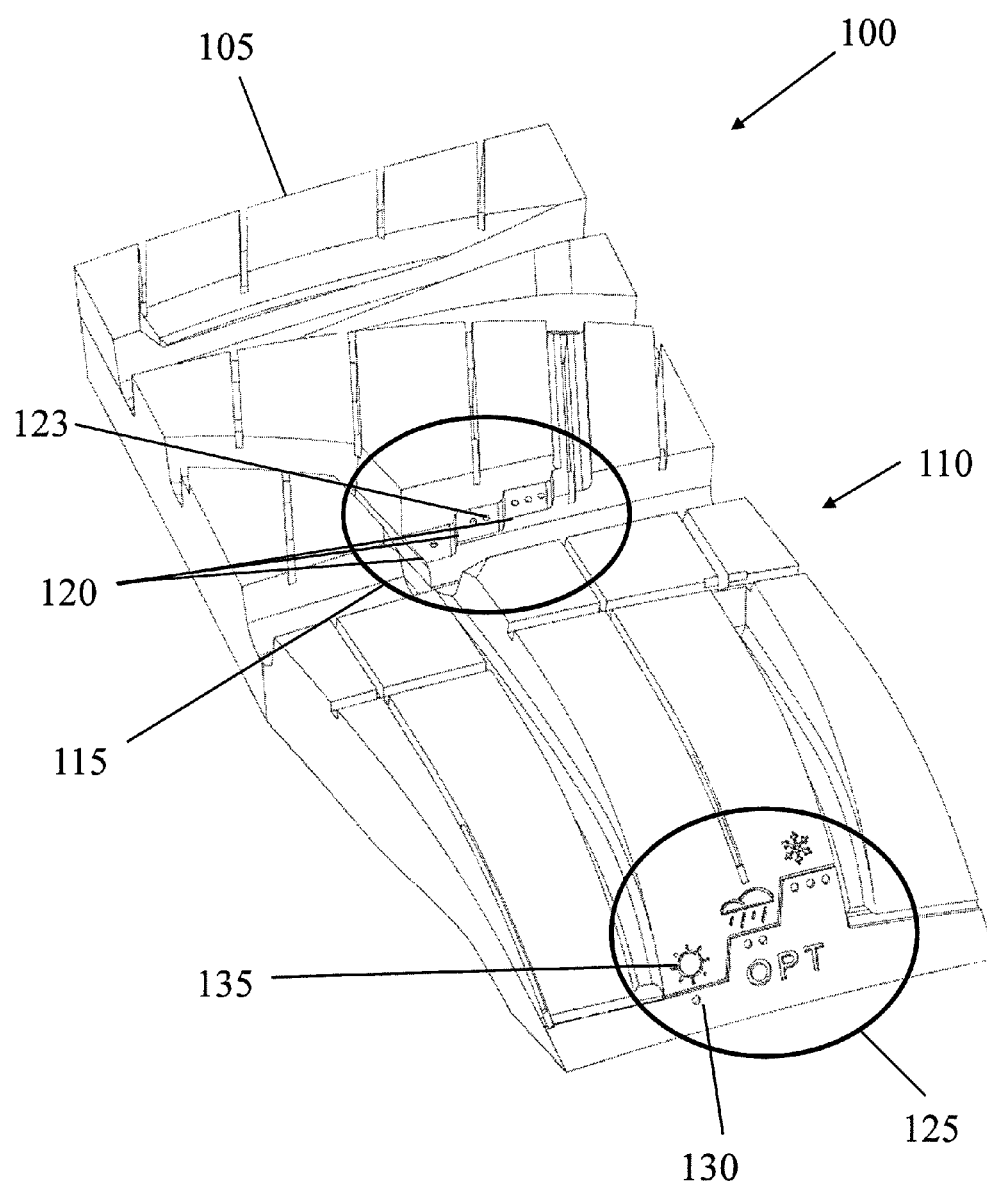
FIG. 1 illustrates an exemplary illustration of a tire having a tire performance indicator in accordance with aspects of the disclosure.

FIG. 1 illustrates an exemplary illustration of a tire 100 having a tire performance indicator 110 in accordance with aspects of the invention. As shown in FIG. 1, the tire performance indicator 110 includes one or more tread wear indicator regions 115, each having plurality of tread wear indicators 120 located within the tread of the tire 100. Additionally, in accordance with aspects of the invention, the tire performance indicator 110 includes one or more optimal performance symbol guides (or tables) 125. As shown in FIG. 1, the one or more optimal performance symbol guides 125 may be respectively axially aligned with the one or more tread wear indicator regions 115. That is, for example, in embodiments, a plane passing through the axis of the tire will intersect both an optimal performance symbol guide 125 and a tire performance indicator 110. Additionally, as shown in FIG. 1, in embodiments, the one or more optimal performance symbol guides 125 are located on (or proximate to) the sidewall region of the tire 100 (e.g., the outer sidewall region) to facilitate easy viewing thereof, e.g., by the tire owner or service professional. That is, in accordance with aspects of the disclosure, in embodiments, the optimal performance symbol guide 125 on the sidewall area of the tire 100 is associated with visible tread wear indicators 120 formed in the tread area to indicate when the optimal weather service of the tire is (or is not) available for various weather conditions.

As shown in FIG. 1, the tread wear indicator region 115 includes plurality of tread wear indicators 120. Each tread wear indicator 120 includes a respective tread wear indicia 123 (e.g., a dot pattern). In embodiments, the wear indicia 123 may have a color to contrast the wear indicia from the tire, thus facilitating easier viewing of the wear indicia 123. In accordance with aspects of the disclosure, as the tire is used, the tread begins to wear, thus, eventually wearing away each tread wear indicia 123 of each respective tread wear indicator 120. For example, with the tire 100 shown in FIG. 1, a highest tread wear indicator 120 (having the three-dot wear indicia 123), relative to the base of the adjacent groove, visually indicates that the tread is within its optimal life for, e.g., snow. Other indicators positioned at different heights relative to the adjacent groove base can also be positioned as indicators for other conditions (e.g., rain, sun, etc.). As the tread wears, the highest tread wear indicator 120 (having the three-dot wear indicia 123) is worn away first, followed by the middle tread wear indicator 120 (having the two-dot wear indicia 123), and subsequently, the lowest tread wear indicator 120 (having the one-dot wear indicia 123).

In an exemplary and non-limiting embodiment, the highest tread wear indicator 120 (having the three-dot wear indicia 123) is worn away when the tread depth reaches $5/32"$, the middle tread wear indicator 120 (having the two-dot wear indicia 123) is worn away when the tread depth reaches $4/32"$, and the lowest tread wear indicator 120 (having the one-dot wear indicia 123) is worn away when the tread depth reaches $2/32"$.

As shown in FIG. 1, the performance symbol guides 125 include one or more weather symbols 135 (e.g., a snow symbol, a rain symbol and/or a sun symbol), and for each weather symbol 135, a corresponding identification pattern 130 (e.g., a dot pattern). The identification patterns 130 under each weather symbol 135 correspond to the wear indicia 123 on the tire tread. That is, in embodiments, the wear indicia 123 and the identification patterns 130 utilize a common pattern scheme (e.g., the common dot pattern scheme) to identify a tread wear indicator 120 corresponding to each of the respective weather symbols 135. In accordance with aspects of the disclosure, once a particular wear indicia 123 is worn away, the optimal performance for the corresponding weather symbol 135 is no longer available. For example, once the highest tread wear indicator 120 (having the three-dot wear indicia 123) is worn away, a user can discern that the optimal performance for the corresponding weather condition (i.e., snowy conditions, as referenced by the corresponding three-dot identification pattern 130) is no longer available. Thus, it can be understood, that upon sufficient tread wear, a tire that is, for example, initially suitable for optimal performance in snowy, rainy and sunny weather conditions, will first lose its optimal performance for snowy weather conditions, followed by its optimal performance for rainy weather conditions, and then its optimal performance for sunny weather conditions.

In accordance with aspects of the invention, in embodiments, the optimal tire performance indicator 110 of the embodiment of the present invention places the performance symbol guide 125 (e.g., the weather symbols 135 and corresponding identification patterns 130), e.g., on the tire's sidewall, so that this performance symbol guide 125 is separated from the tread wear indicators 120, and protected from normal tread wear. In this manner, the weather symbols 135 and the identification patterns 130 are more permanent and readily visible for reference by, for example, the tire owner, throughout the tire's life. While the exemplary performance symbol guide 125 is described as having both the weather symbols 135 and corresponding identification patterns 130 for each respective weather condition, the invention contemplates that, in embodiments, a performance symbol guide 125 may only utilize a single pattern (e.g., a weather symbol 135 or an identification pattern 130 for each respective weather condition.

In embodiments, a tire may include a plurality of optimal tire performance indicators 110 (e.g., three or four, amongst other contemplated amounts) located around the circumference of the tire 100 (e.g., in an equally-spaced arrangement). For example, with a non-limiting embodiment, a tire 100 may include four optimal tire performance indicators 110 equally spaced around the circumference of the tire 100 (i.e., offset from one another by approximately 90°). Additionally, while the exemplary optimal tire performance indicator 110 includes a performance symbol guide 125 respectively arranged with each tread wear indicator region 115, in embodiments, a tire may have more performance symbol guides 125 than tread wear indicator regions 115, and vice versa.

While the exemplary and non-limiting embodiment of FIG. 1 illustrates an optimal tire performance indicator 110 configured for three different weather/road conditions, the disclosure contemplates a tire performance indicators for more or fewer weather/road conditions. For example, a non-snow tire may not ever be suitable for snowy conditions, and as such, a tire performance indicator may only indicate optimal performance for rainy and sunny weather conditions.

Additionally, while the exemplary and non-limiting embodiment of FIG. 1 illustrates the performance symbol guide 125 arranged on the sidewall region of the tire 100, the disclosure contemplates that the performance symbol guide 125 could be located in other positions (e.g., within the tread region).

Figure 2:
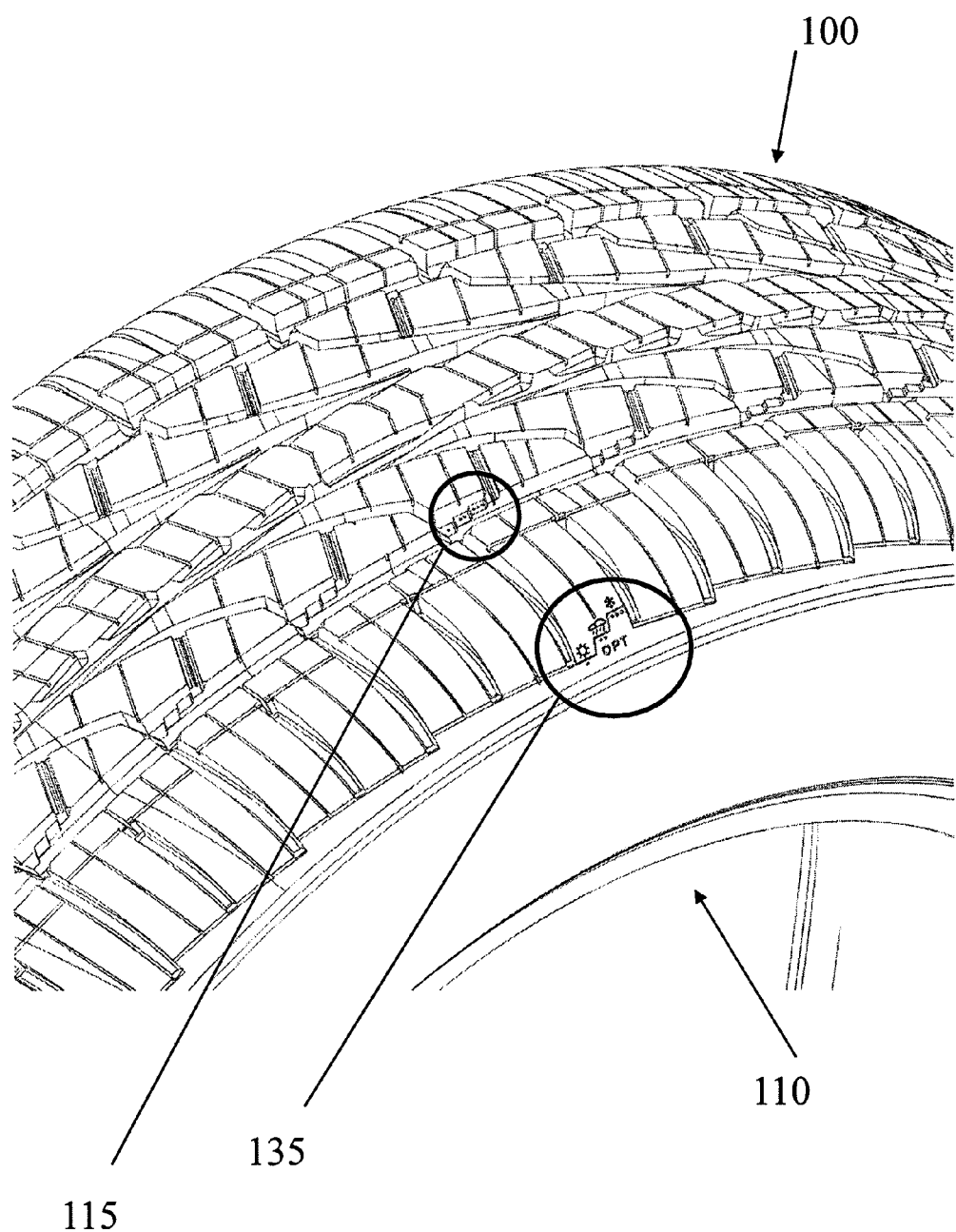
FIG. 2 illustrates another exemplary view of a tire having a tire performance indicator in accordance with aspects of the disclosure.

FIG. 2 illustrates another exemplary view of a tire 100 having a tire performance indicator 110 in accordance with aspects of the disclosure. As shown in FIG. 2, the tire performance indicator 110 includes the performance symbol guide 125 arranged on the sidewall region of the tire 100. Additionally, as shown in FIG. 2, the tire performance indicator 110 includes tread wear indicator region 115 arranged within the tread. Moreover, in accordance with aspects of the disclosure, in embodiments, the tread wear indicator region 115 is located towards an outer side of the tire 100 in an axial (or tread width) direction of the tire relative to the center of the tire in the axial (or tread width) direction, so as to permit easier viewing of the tread wear indicator region 115.

In accordance with additional aspects of the present invention, embodiments of the invention are also directed to a method of making a tire having a tire performance indicator. In embodiments, a suitable tire mold is provided, which is structured and arranged to form the elements of the tire performance indicator. As the ordinarily skilled artisan would readily understand how to make a tire having the tire performance indicator no further description is necessary for an understanding of this aspect of an embodiment of the present invention.

While the invention has been described with reference to specific embodiments, those skilled in the art will understand that various changes may be made and equivalents may be substituted for elements thereof without departing from the true spirit and scope of the invention. In addition, modifications may be made without departing from the essential teachings of the invention.

What is claimed is:

1. A tire performance indicator for a tire, comprising
at least one tread wear indicator region structured and arranged in a tread region of the tire; and
at least one performance symbol guide structured and arranged approximate a sidewall region of the tire,
wherein the at least one performance symbol guide comprises at least one weather symbol.

2. The tire performance indicator of claim 1, wherein the at least one tread wear indicator region comprises at least two tread wear indicators, each having a different height relative to a base of an adjacent groove, and each configured to be worn away with progressive use of the tire.

3. The tire performance indicator of claim 1, wherein the at least one tread wear indicator region comprises three tread wear indicators each having a different height relative to a base of an adjacent groove, and each configured to be worn away with progressive use of the tire.

4. The tire performance indicator of claim 2, wherein the at least two tread wear indicators comprise respective wear indicia.

5. The tire performance indicator of claim 4, wherein the respective wear indicia comprise different dot patterns.

6. The tire performance indicator of claim 4, wherein the at least two tread wear indicators comprise three tread wear indicators having respective wear indicia, wherein the respective wear indicia are configured to be worn away at a tread thickness of $5/32$", $4/32$" and $2/32$", respectively.

7. The tire performance indicator of claim 1, wherein the at least one performance symbol guide comprises two or more weather symbols, and for each weather symbol, a corresponding identification pattern.

8. The tire performance indicator of claim 7, wherein the two or more weather symbols comprise three weather symbols.

9. The tire performance indicator of claim 7, wherein the three weather symbols comprise:
a sunny weather conditions symbol;
a rainy weather conditions symbol; and
a snowy weather conditions symbol.

10. The tire performance indicator of claim 7, wherein:
the at least one tread wear indicator region comprises at least two tread wear indicators, each having a different height relative to a base of an adjacent groove,
the at least two tread wear indicators comprise respective wear indicia configured to be worn away with progressive use of the tire, and
the wear indicia and the identification patterns utilize a common pattern scheme to identify a tread wear indicator corresponding to each of the respective weather symbols.

11. The tire performance indicator of claim 1, wherein at least one tread wear indicator region and the at least one performance symbol guide are axially aligned with each other.

12. The tire performance indicator of claim 1, wherein:
the at least one tread wear indicator region comprises a plurality of tread wear indicator regions circumferentially spaced around the tire,
the at least one performance symbol guide comprises a plurality of performance symbol guide circumferentially spaced around the tire, and
respective tread wear indicator regions and performance symbol guides are axially aligned with each other.

13. A method of forming a tire having a tire performance indicator, the tire performance indicator including at least one tread wear indicator region structured and arranged in a tread region of the tire, the at least one tread wear indicator region having at least one tread wear indicator located at a height to indicate a wear limit for a predetermined condition, at least one performance symbol guide structured and arranged approximate a sidewall region of the tire, the at least one performance symbol guide comprises at least one weather symbol, the method comprising:
forming the tire so that the at least one tread wear indicator region and the at least one performance symbol guide are axially aligned.

14. The method of claim 13, wherein the at least one weather symbol comprises two or more weather symbols, which include at least two of:
a sunny weather conditions symbol;
a rainy weather conditions symbol; and
a snowy weather conditions symbol.

15. The method of claim 13, wherein each of the at least one tread wear indicator comprises a respective wear indicia having a different dot pattern.

16. The method of claim 15, wherein the respective wear indicia of the at least one tread wear indicator region correspond with respective identification patterns of the at least one performance symbol guide.

17. A method of determining whether a tire is suited for optimal performance for a given weather condition, the tire having a tire performance indicator comprising at least one performance symbol guide structured and arranged approximate a sidewall region of the tire, the at least one performance symbol guide having at least one weather symbol, and for each of the at least one weather symbol, a corresponding identification pattern, the method comprising:
determining the suitability of the tire for optimal performance by observing a weather symbol.

18. The method of claim 17, wherein the tire performance indicator further comprises:
at least one tread wear indicator region structured and arranged in a tread region of the tire, the at least one tread wear indicator region having at least one tread wear indicator, each of the at least one tread wear indicator having a different height and a respective wear indicia configured to be worn away with progressive use of the tire, and the method further comprising:
identifying a highest tread wear indicator on which the respective wear indicia remains by its respective wear indicia;
correlating the respective wear indicia of the highest tread wear indicator on which the respective wear indicia remains to a respective identification pattern; and
identifying the weather symbol corresponding to the respective identification pattern to determine the optimal performance range for the tire.

19. The method of claim 17, wherein the tire performance indicator further comprises:
at least one tread wear indicator region structured and arranged in a tread region of the tire, the at least one tread wear indicator region having at least one tread wear indicator, each of the at least one tread wear indicator having a different height and a respective wear indicia configured to be worn away with progressive use of the tire, and the method further comprising:
identifying a respective identification pattern corresponding to a particular weather condition using the performance symbol guide;
determining whether the respective wear indicia corresponding to the identification pattern remains on a respective tread wear indicator; and
when the wear indicia remains on a respective tread wear indicator, determining that the tire retains its optimal tire performance for the particular weather condition.

20. The method of using the tire performance indicator of claim 18, wherein the wear indicia and the identification patterns utilize a common pattern scheme to identify a tread wear indicator corresponding to each of the respective weather symbols.

\* \* \* \* \*